(12) United States Patent
Harada et al.

(10) Patent No.: US 6,183,052 B1
(45) Date of Patent: Feb. 6, 2001

(54) APPARATUS AND METHOD FOR CONTROLLING BEHAVIOR OF A VEHICLE

(75) Inventors: Masaharu Harada, Kawasaki; Katsushi Matsuda; Kunio Sakata, both of Yokohama, all of (JP)

(73) Assignee: Mitsubishi Jidosha Kabushiki Kaisha, Tokyo (JP)

( * ) Notice: Under 35 U.S.C. 154(b), the term of this patent shall be extended for 0 days.

(21) Appl. No.: 09/049,119

(22) Filed: Mar. 27, 1998

(30) Foreign Application Priority Data

Mar. 28, 1997 (JP) .................................................. 9-078399

(51) Int. Cl.⁷ ...................................................... B60T 8/60
(52) U.S. Cl. ............................................. 303/147; 303/140
(58) Field of Search ..................................... 303/146, 147, 303/140, 9.68; 701/72, 82, 83, 84; 192/13 A; 188/365, 366, 367, 368, 369

(56) References Cited

U.S. PATENT DOCUMENTS

| 4,647,115 | * | 3/1987 | Leiber et al. | 303/146 |
| 5,089,967 | * | 2/1992 | Haseda et al. | 303/146 |
| 5,229,944 | * | 7/1993 | Yasuno | 303/146 |
| 5,267,783 | * | 12/1993 | Inoue et al. | 303/146 |
| 5,303,989 | * | 4/1994 | Yasuno et al. | 303/147 |
| 5,428,532 | * | 6/1995 | Yasuno | 303/146 |
| 5,722,743 | * | 3/1998 | Sano | 303/146 |
| 5,746,486 | * | 5/1998 | Paul et al. | 303/146 |
| 5,762,406 | * | 6/1998 | Yasui et al. | 303/147 |
| 5,782,543 | * | 7/1998 | Monzaki et al. | 303/147 |
| 5,829,847 | * | 11/1998 | Tozu et al. | 303/147 |

FOREIGN PATENT DOCUMENTS

| 19515061A1 | 5/1996 | (DE) . |
| 19626406A1 | 1/1997 | (DE) . |
| 7-137618 | 5/1995 | (JP) . |
| 8-310360 | 11/1996 | (JP) . |

* cited by examiner

Primary Examiner—Matthew C. Graham
Assistant Examiner—Thomas J. Williams

(57) ABSTRACT

An apparatus for controlling the turning behavior of a vehicle controls the braking forces of diagonally located wheels of the vehicle independently of depression of a brake pedal to produce a target braking force difference between the controlled wheels when the vehicle is turning, thereby applying a desired yaw moment to the vehicle. The braking forces of the controlled wheels are determined taking account of actual braking forces of respective non-controlled wheels which are located on the other, right or left side of the corresponding controlled wheels.

10 Claims, 7 Drawing Sheets

APPARATUS AND METHOD FOR CONTROLLING BEHAVIOR OF A VEHICLE

BACKGROUND OF THE INVENTION

1. Field of the Invention

This invention relates to an apparatus and method for properly controlling the braking forces applied to the wheels of a motor vehicle when the vehicle is turning, to stabilize turning behavior of the vehicle.

2. Description of the Related Art

A control apparatus for a motor vehicle disclosed in Unexamined Japanese Patent Publication (KOKAI) No. 8-310360, for example, controls the braking forces applied to a pair of diagonally located wheels when the vehicle is turning, to produce a difference of braking force between these wheels. Such a difference in braking force acts upon the vehicle as a turning moment or a returning moment. The turning moment serves to cancel out understeer of the vehicle, while the returning moment serves to cancel out oversteer of the vehicle, whereby the turning behavior of the vehicle is stabilized.

The difference of braking force to be produced between the pair of controlled wheels is determined in accordance with the turning state, that is, required yaw moment, of the vehicle. If, however, the driver further depresses the brake pedal after the difference between the braking forces to be applied to the controlled wheels is determined, the braking forces applied to all wheels of the vehicle increase, with the result that a desired difference cannot be produced between the braking forces applied to the controlled wheels. In the above control apparatus, therefore, if the brake pedal is further depressed while the vehicle is turning, the turning behavior control is canceled at this point of time.

SUMMARY OF THE INVENTION

An object of this invention is to provide a control apparatus and a control method which permit both turning behavior control of a motor vehicle and braking force control based on driver's operation of the brake pedal to be performed in a compatible manner.

An apparatus for carrying out a control method according to this invention comprises wheel brakes provided for the respective wheels, each of the wheel brakes being supplied with a braking pressure and applying a braking force to a corresponding one of the wheels; an adjusting device connected to the wheel brakes, the adjusting device being capable of adjusting the braking pressures of two, right and left wheels, among the wheels, independently of driver's braking operation; a detection device for the vehicle, the detection device including a plurality of sensors arranged in the vehicle and detecting a traveling state of the vehicle based on outputs from the sensors when the vehicle is turning; brake controllers connected to brake circuits for supplying the braking pressures to the wheel brakes, respectively, and detecting fluid pressures in the brake circuits which are indicative of actual braking pressures in the wheel brakes, respectively; and a control device connected to the detection device and the brake controllers. The control device receives outputs of the detection device and the brake controllers and performs the following operations:

The control device sets a target braking force difference to be produced between right and left wheels, selects one of the right and left wheels as a controlled wheel, determines a target braking pressure for the controlled wheel based on the target braking force difference and the actual braking pressure of a non-selected one of the right and left wheels, and controls the actual braking pressure of the controlled wheel by means of the adjusting device in accordance with the target braking pressure, thereby producing the target braking force difference between the right and left wheels and applying yaw moment to the vehicle.

With the above control apparatus, even if the braking operation by the driver changes after the target braking force difference for the controlled wheel is determined, the actual braking pressure of the controlled wheel is controlled taking account of the actual braking pressure of the non-selected wheel. Consequently, the target braking force difference can be produced with accuracy between the controlled wheel and the non-selected wheel, whereby a desired yaw moment is applied to the vehicle and thus the turning behavior of the vehicle is stabilized.

The control device preferably performs feedback control such that the actual braking pressure of the controlled wheel becomes equal to the target braking pressure.

Still preferably, the controlled wheel and the non-selected wheel are an outer front wheel and an inner rear wheel as viewed in a turning direction of the vehicle, respectively.

The detection device may include, as the aforementioned sensors, a yaw rate sensor for detecting a yaw rate of the vehicle, wheel speed sensors for detecting speeds of the wheels, a longitudinal acceleration sensor for detecting a longitudinal acceleration of the vehicle, a lateral acceleration sensor for detecting a lateral acceleration of the vehicle, and an angle sensor for detecting a rotational angle of a steering wheel of the vehicle. In this case, the detection device may further include a state-of-motion calculation circuit for calculating a state of motion of the vehicle based on outputs supplied thereto from the yaw rate sensor, the wheel speed sensors, the longitudinal acceleration sensor and the lateral acceleration sensor, and outputting a result of calculation, and a driving operation calculation circuit for calculating a state of driver's driving operation based on an output of the angle sensor supplied thereto, and outputting a result of calculation. This detection device can accurately detect the traveling state of the vehicle.

The adjusting device may include automatic brake circuits connecting an air tank containing compressed air to the wheel brakes, and may further include a supply valve, a pressure control valve and an air over hydraulic booster arranged in each of the automatic brake circuits in series from an air tank side. Specifically, the supply valve comprises a normally-open, solenoid-operated on-off valve and supplies compressed air from the air tank to the corresponding automatic brake circuit when opened. The pressure control valve adjusts pressure of the compressed air supplied from the corresponding supply valve and supplies the adjusted air pressure to the corresponding air over hydraulic booster. The air over hydraulic booster converts the air pressure supplied from the corresponding pressure control valve to hydraulic pressure, to thereby generate a braking pressure in a corresponding one of the wheel brakes. A brake system including such automatic brake circuits is suited for use in a heavy-duty vehicle such as a truck or bus.

Preferably, the detectors each detect an air pressure in the corresponding automatic brake circuit at a location more upstream than the corresponding air over hydraulic booster.

Further scope of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
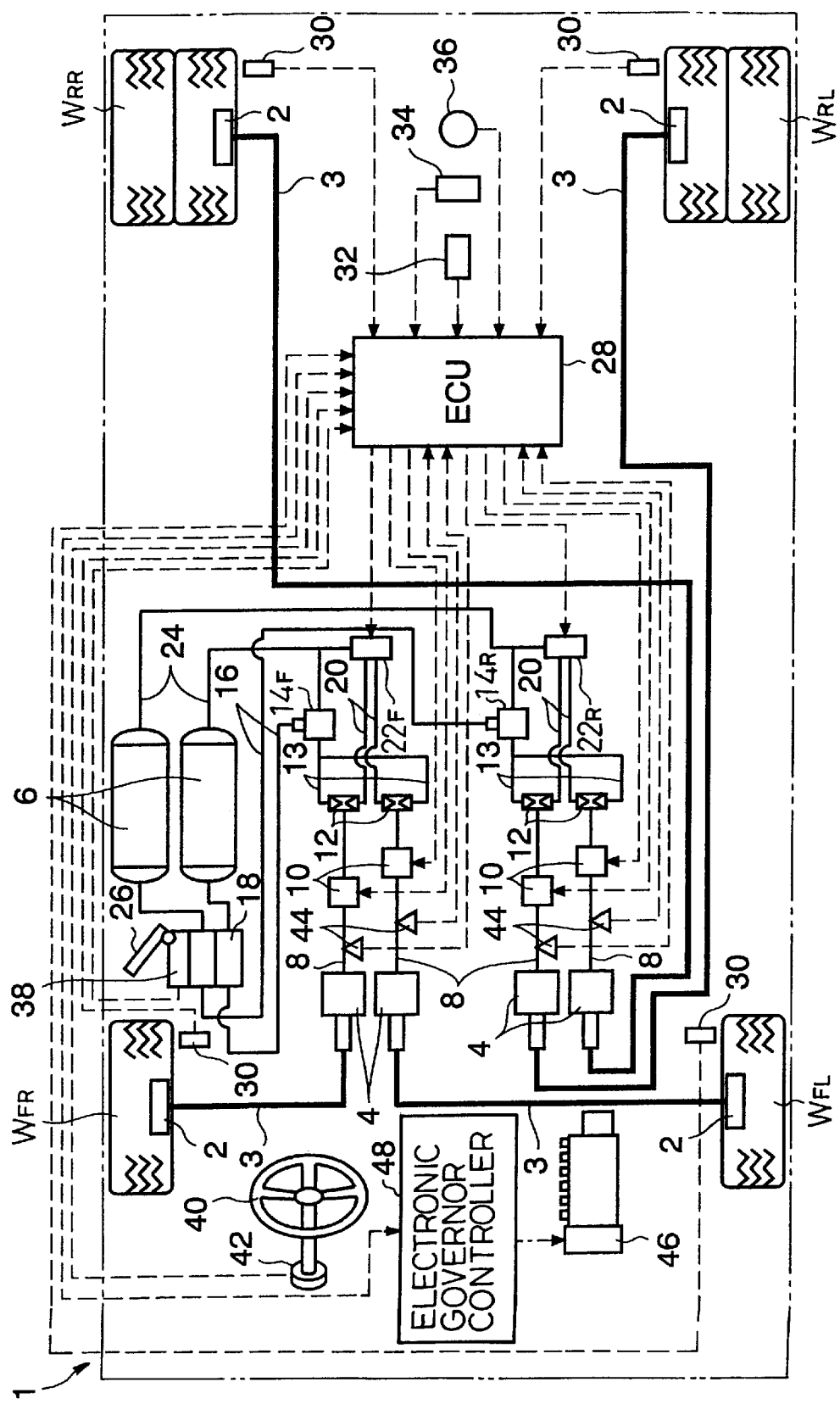
FIG. 1 is a schematic diagram of a brake system for a motor vehicle, including a control apparatus according to one embodiment of the invention.

Referring to FIG. 1, there is illustrated a brake system applied to a heavy-duty motor vehicle 1 such as a truck or bus. The vehicle 1 has front wheels $W_{FL}$ and $W_{FR}$ for steering, and double tire-type rear wheels $W_{RL}$ and $W_{RR}$ as driving wheels. Each wheel is provided with a wheel brake 2, which is connected to a corresponding air over hydraulic booster 4 through hydraulic piping 3. The boosters 4 transmit air pressures applied thereto to the brake fluid in the respective hydraulic pipes 3, that is, in the respective wheel brakes 2. The boosters 4 can thus be applied with air pressures from respective pneumatic pipes 8.

The pneumatic pipes 8 are connected to respective double check valves 12. More specifically, each double check valve 12 has two inlet ports and one outlet port, and each pneumatic pipe 8 is connected to the outlet port of the corresponding double check valve 12. A connecting pipe 13 extends from one of the inlet ports of each double check valve 12. The two connecting pipes 13 for the front wheels $W_{FL}$ and $W_{FR}$ are connected to a front relay valve $14_F$, and the two connecting pipes 13 for the rear wheels $W_{RL}$ and $W_{RR}$ are connected to a rear relay valve $14_R$. Supply pipes 24 extend from the respective relay valves $14_F$ and $14_R$ and are connected to corresponding air tanks 6, respectively. Namely, the boosters 4 associated with the front wheels and the boosters 4 associated with the rear wheels are connected to the respective air tanks 6 so that the two boosters associated with the front or rear wheels can be supplied with air pressure from the same air tank 6. Each air tank 6 is supplied with compressed air from a compressor which is driven by the engine of the vehicle.

The relay valves 14 each have an input port, and pilot pipes 16 for the front and rear wheels extend from the respective input ports. The pilot pipes 16 are connected to a dual brake valve 18. The brake valve 18 has two valve chambers (not shown) which are connected to the respective air tanks 6.

A connecting pipe 20 extends from the other of the inlet ports of each double check valve 12. The two connecting pipes 20 for the front wheels are connected to a front supply valve $22_F$, and the two connecting pipes 20 for the rear wheels are connected to a rear supply valve $22_R$. The supply valves $22_F$ and $22_R$ are connected to the corresponding supply pipes 24. More specifically, each supply pipe 24 bifurcates at a downstream portion thereof, and the relay valve 14 and the supply valve 22 are connected to the respective branches.

Thus, the brake system is provided with service brake circuits and automatic brake circuits: the service brake circuits include the pneumatic lines having the relay valves 14, the pilot pressure lines and the hydraulic lines, while the automatic brake circuits include the pneumatic lines having the supply valves 22, and the hydraulic lines.

The service brake circuits function as follows:

When the driver steps on a brake pedal 26, the brake valve 18 is set in operation. The brake valve 18 supplies the air pressure, supplied thereto from the air tanks 6, to the input ports of the relay valves $14_F$ and $14_R$ respectively through the pilot pipes 16 as signal pressure. The relay valves 14 are opened such that their opening corresponds to the signal pressure, that is, the force of depression, or the depression stroke, of the brake pedal 26. With the relay valves 14 thus opened, air pressure is supplied from the air tanks 6 to the boosters 4 through the supply pipes 24, the connecting pipes 13 and the pneumatic pipes 8. The boosters 4 convert the air pressure to hydraulic pressure, which is then transmitted to the brake fluid in the respective hydraulic pipes 3. As a result, braking pressure builds up inside the wheel brakes 2 and braking force is applied to the wheels $W_{FL}$, $W_{FR}$, $W_{RL}$ and $W_{RR}$.

As the driver decreases or increases the depression stroke of the brake pedal 26, the signal pressure supplied from the brake valve 18 to the relay valves $14_F$ and $14_R$ varies in response to such a change in the depression stroke, whereby the braking force applied to the individual wheels is adjusted. If the brake pedal 26 is released from depression, the brake valve 18 stops the supply of the signal pressure, thereby closing the relay valves 14. When the relay valves 14 are thus closed, compressed air in the pneumatic lines extending from the relay valves 14 to the boosters 4 are released from the relay valves 14 into the atmosphere, and accordingly, the braking pressure of the individual wheels drops to a non-braked level.

The automatic brake circuits operate independently of the driver's braking operation, and can apply a braking force to each wheel. More specifically, when the supply valves $22_F$ and $22_R$ are opened, air pressure is supplied from the air tanks 6 to the boosters 4, with the result that braking pressure builds up inside the individual wheel brakes 2.

The supply valves 22 are electrically connected to an electronic control unit (ECU) 28 and their opening/closing operation is controlled by the ECU 28. Each supply valve 22 has two built-in solenoid-operated valves (hereinafter referred to as solenoid valves), each of which comprises a three-port, two-position directional control valve. More specifically, each solenoid valve has an inlet port, an outlet port and a discharge port. In the supply valve $22_F$ for the front wheels, the inlet ports of the two solenoid valves are connected to the supply pipe 24 associated therewith, while the outlet ports of the same are connected to the respective two connecting pipes 20 associated therewith. Also in the supply valve $22_R$ for the rear wheels, the inlet and outlet ports of the two solenoid valves are connected in a similar manner. In FIG. 1, the electrical connection between the ECU 28 and each supply valve 22 is indicated by a single line for simplicity of illustration.

When the solenoid valve is in a rest position, communication between the inlet and outlet ports thereof is blocked, while the outlet and discharge ports communicate with each other. On the other hand, when the solenoid valve is shifted from the rest position to an operating position, communication between the inlet and outlet ports is established while communication between the outlet and discharge ports is blocked. As a result, air pressure is supplied from the air tank 6 to the booster 4 via the supply valve 22, so that braking pressure builds up in the wheel brake 2 of the wheel associated therewith.

The ECU 28 can operate the individual solenoid valves of the supply valves $22_F$ and $22_R$ independently of one another in such a manner that braking force is applied to only one of the front or rear wheels. Namely, the ECU 28 can apply braking force to a desired wheel.

Figure 2:
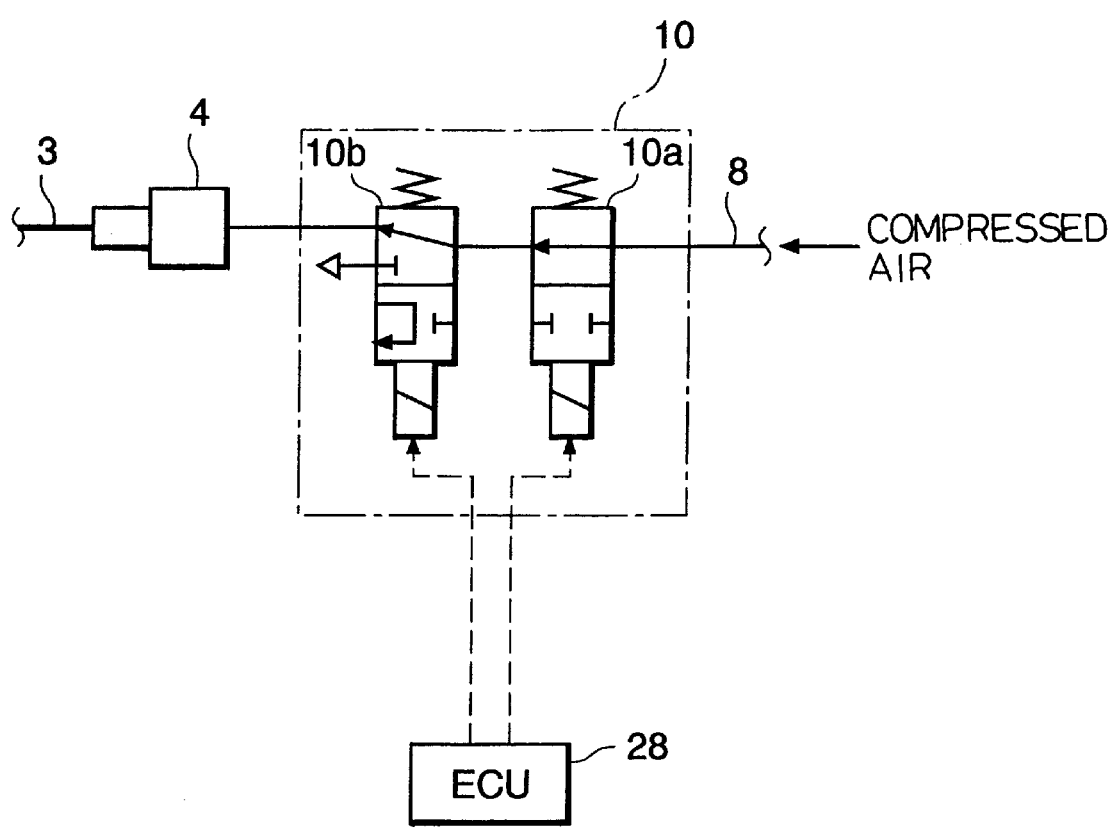
FIG. 2 is a diagram specifically showing the structure of a pressure control valve in the system.

The automatic brake circuits are further provided with pressure control valves 10, each of which is inserted in the corresponding pneumatic pipe 8 connecting the booster 4 and double check valve 12 associated therewith, as shown in FIG. 1. Like the aforementioned supply valves 22, each of the pressure control valves 10 has two solenoid valves built therein. FIG. 2 specifically shows the two solenoid valves 10a and 10b in each pressure control valve 10, and the solenoid valves 10a and 10b are arranged in order such that the former is closer to the double check valve 12 than the latter is. The solenoid valve 10a is a solenoid-operated on-off valve, while the solenoid valve 10b is a three-port, two-position directional control valve. More specifically, the solenoid valve lob has an inlet port connected to an upstream portion of the pneumatic pipe 8, and outlet and discharge ports connectable to a downstream portion of the pneumatic pipe 8. When the solenoid valves 10a and 10b are each in a rest position as illustrated in FIG. 2, the pneumatic pipe 8 is open. In this case, air pressure can be supplied to the booster 4 through the pneumatic pipe 8. On the other hand, when the solenoid valve 10a is shifted from the rest position to an operating position, a portion of the pneumatic pipe 8 between the solenoid valve 10a and the booster 4 is pneumatically isolated. In this case, the air pressure in the booster 4 is maintained.

If the solenoid valve 10b, in addition to the solenoid valve 10a, is shifted from the rest position to an operating position, a portion of the pneumatic pipe 8 between the solenoid valve lob and the booster 4 communicates with the atmosphere through the discharge port of the solenoid valve 10b. Consequently, the air pressure in the booster 4 is released into the atmosphere and the braking pressure inside the wheel brake 2 drops. In FIG. 1, the electrical connection between the ECU 28 and each pressure control valve 10 also is indicated by a single line for simplicity of illustration.

With the automatic brake circuits described above, the supply valves 22 are subjected to switching operation to supply air pressure to the respective boosters 4, thereby building up braking pressure in the wheel brakes 2, and the braking pressure thus built up is controlled by switching operation of the individual pressure control valves 10. Thus, the automatic brake circuits are capable of controlling the braking pressure in the individual wheel brakes 2 independently of the driver's operation of the brake pedal.

The ECU 28 controls the switching operations of the supply valves 22 and pressure control valves 10 of the automatic brake circuits in accordance with a traveling state of the vehicle 1, that is, the state of motion or driving operation of the vehicle. To this end, the ECU 28 has a storage circuit, signal processing circuit, arithmetic circuit, determination circuit, control circuit, command circuit, etc. built therein and are electrically connected to various sensors. Sensors for detecting the state of motion of the vehicle include wheel speed sensors 30 for detecting the rotational speeds of the respective wheels, a longitudinal acceleration sensor 32 for detecting the longitudinal acceleration acting on the vehicle body in a longitudinal direction thereof, a lateral acceleration sensor 34 for detecting the lateral acceleration of the vehicle body, a yaw rate sensor 36 for detecting the yaw rate of the vehicle body, etc. Sensors for detecting the state of driving operation of the vehicle include a stroke sensor 38 for detecting the depression stroke of the brake pedal 26, that is, the pedal stroke, an angle sensor 42 for detecting the rotational angle of a steering wheel 40, etc.

To the ECU 28 are further electrically connected air pressure sensors 44 and an electronic governor controller 48. The air pressure sensors 44 are provided for the respective pneumatic pipes 8, detect the air pressures supplied to the respective boosters 4, and supply detection ignals to the ECU 28. The electronic governor controller 8 outputs a command signal directly to an electronic governor 46 associated with a fuel injection pump, to control the quantity of fuel delivered from the fuel injection pump, that is, the fuel injection quantity.

Figure 3:
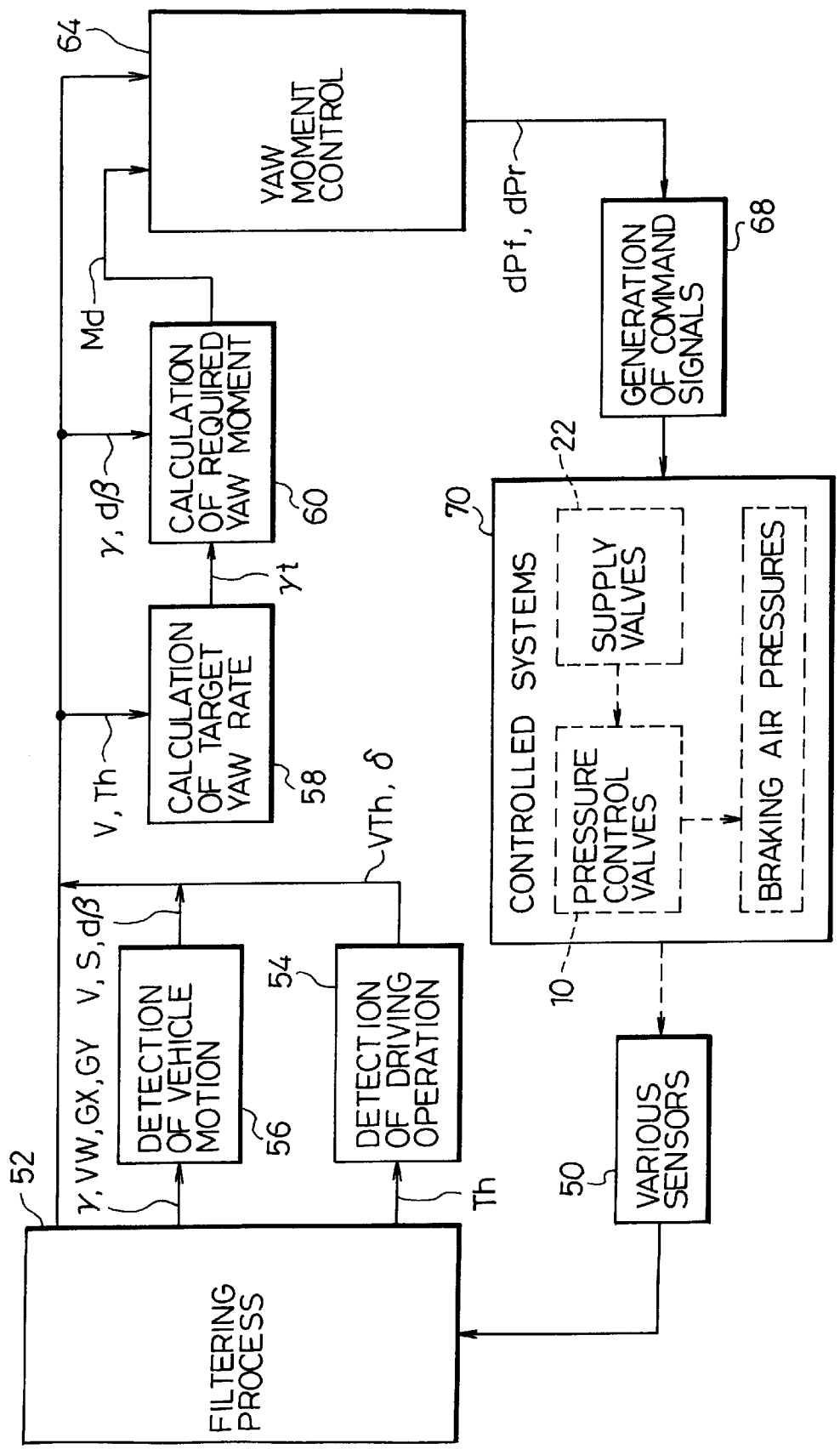
FIG. 3 is a block diagram showing a procedure for controlling the turning behavior of a vehicle.

FIG. 3 is a block diagram showing the functions performed by the ECU 28 in relation to operation control of the automatic brake circuits. The detection signals from the aforementioned various sensors (block 50) are subjected to filtering process (block 52) and then supplied to calculation blocks 54, 56, 58 and 60. Outputs of the calculation blocks 56, 58 and 60 are supplied to a control block 64, which then determines target controlled variables for automatic braking and supplies the same to a command block 68. The command block 68 generates final command signals based on the target controlled variables supplied thereto, and supply the command signals to controlled systems 70. The controlled systems 70 Include the supply valves 22 and the pressure control valves 10 mentioned above. The results of operations of the supply valves 22 and pressure control valves 10 are reflected in the air pressures supplied to the corresponding boosters 4, that is, braking air pressures. The braking air pressures for the respective wheels are detected by the sensors 44, the detection signals of which are fed back to the filtering process block 52. This feedback control system has a control cycle of, for example, 8 ms.

Yaw moment control for the vehicle will be now briefly explained below.

A basic concept of the yaw moment control is to produce a difference of braking force between the right and left wheels when the vehicle is turning. Specifically, a difference of braking force is generated between the left and right wheels of the vehicle and the right front wheel $W_{FR}$ and the left rear wheel $W_{RL}$. Such a braking force difference acts upon the vehicle as turning moment that assists the vehicle turn, or returning moment that counteracts the vehicle turn. Consequently, an actual yaw moment of the vehicle is brought to a target yaw moment, so that the turning behavior of the vehicle is stabilized.

The wheels to be controlled by the yaw moment control are not limited to the above diagonally located wheels, and may be the right and left front wheels or the right and left rear wheels.

The block diagram of FIG. 3 will be now described in more detail.

The calculation block 56 calculates the state of motion of the vehicle based on sensor information such as the wheel speeds $v_W$ of the respective wheels, the longitudinal acceleration $G_X$, lateral acceleration $G_Y$ and yaw rate $\gamma$ of the vehicle, etc. The state of motion of the vehicle includes a vehicle body speed v, slip ratios S of the respective wheels, a slip angular velocity $d\beta$ of the center of gravity, etc.

The calculation block 54 calculates an operational angular velocity $v_{Th}$ and a steering angle $\delta$ of the front wheels, based on an angle $T_h$ of operation of the steering wheel 40 detected by the angle sensor 42.

Based on the vehicle body speed v and the steering angle $\delta$, the calculation block 58 calculates a target yaw rate $\gamma_t$ of the vehicle. Specifically, the target yaw rate $\gamma_t$ is calculated according to the following equation (1) based on a linear two-wheel model:

$$\gamma_t = (v/(1+A\cdot v^2))\cdot(\delta/L) \tag{1}$$

where A represents a stability factor, and L represents a wheel base (m).

Based on a deviation of an actual yaw rate $\gamma$ from the target yaw rate $\gamma_t$, the calculation block 60 calculates a required yaw moment $M_d$ to be applied to the vehicle 1. The required yaw moment $M_d$ output from the calculation block 60 takes a positive or negative value depending on whether the yaw rate deviation is positive or negative. If the required yaw moment $M_d$ takes a positive value, it means that the vehicle tends to understeer, and if the required yaw moment $M_d$ takes a negative value, then it means that the vehicle tends to oversteer.

Further, the calculation block 60 compares the yaw rate deviation with a positive or negative threshold, and outputs the result of comparison. These thresholds serve as a condition for initiating the yaw moment control.

The function of the control block 64 will be described in detail below.

Before execution of the yaw moment control using the automatic brake circuits, the control block 64 first selects wheels to be controlled. Specifically, the outer front wheel and the inner rear wheel as viewed in the turning direction of the vehicle are selected as the wheels to be controlled.

Then, based on the turning direction and understeer (US) or oversteer (OS) of the vehicle, the control block 64 determines a braking pressure control mode for each of the wheels. The turning direction of the vehicle can be detected by making a determination as to whether the detected yaw rate takes a positive value or not, or based on the direction of rotation of the steering wheel 40.

TABLE 1 below shows control modes for the respective wheels.

TABLE 1

|  | Right Turn | | Left Turn | |
| --- | --- | --- | --- | --- |
|  | US | OS | US | OS |
| $W_{FL}$ | Minus | Plus | — | — |
| $W_{FR}$ | — | — | Minus | Plus |
| $W_{RL}$ | — | — | Plus | Minus |
| $W_{RR}$ | Plus | Minus | — | — |

In TABLE 1, "Plus" denotes a control mode in which the braking pressure (control air pressure) of the wheel is increased, "Minus" denotes a control mode in which the braking pressure of the wheel is decreased, and "—" denotes a mode in which the braking pressure of the wheel is not controlled. Wheels of the non-control mode are those wheels which are not controlled during the yaw moment control.

As is clear from TABLE 1, during the yaw moment control, the braking pressure of one of the controlled wheels is increased, while the braking pressure of the other of the controlled wheels is decreased. Consequently, there occurs a difference in braking pressure, that is, braking force, between the controlled wheels, whereby the vehicle is given turning moment or returning moment. The turning or returning moment represents the aforementioned required yaw moment $M_d$ of the vehicle, and the braking pressures of the controlled wheels are controlled in accordance with the required yaw moment.

More specifically, the control block 64 first calculates a difference between target braking forces to be produced between the left and right wheels to be controlled, in accordance with the required yaw moment $M_d$.

Provided an amount of change in braking force of each of the diagonally located wheels to be controlled is dF and a yaw moment of the vehicle acted upon by the change dF is M, when the vehicle makes a turn with the brake pedal 26 depressed by the driver, the relationship between the change dF in braking force and the yaw moment M is given by equation (2) below. In equation (2), no consideration is given to change in the lateral force of the tire.

$$2\cdot(dF\cdot T/2) = M \tag{2}$$

where T represents a tread [m].

The yaw moment M corresponds to half the required yaw moment $M_d$. Accordingly, using the required yaw moment $M_d$, the amount of change dF in braking force of one wheel to be controlled can be calculated according to equation (2). The difference between the target braking forces is twice as large as the change dF.

The amount of change dF in braking force can be regarded as an amount of change in the braking pressure within the wheel brake 2, that is, a controlled variable. As mentioned above, the braking pressure of the wheel brake 2 is determined by the braking air pressure supplied to the booster 4. Therefore, the change dF of braking force can be attained through control of the braking air pressure.

Equation (2) can be rewritten as indicated by the following equations, wherein the amount of change dF in braking force of one wheel to be controlled is expressed separately as controlled variables $dP_f$ and $dP_r$ for the braking air pressures of the front and rear wheels, respectively:

$$dP_f\cdot B_f\cdot T_f/2 = M_d/2 \tag{3.1}$$

$$dP_r\cdot B_r\cdot T_r/2 = M_d/2 \tag{3.2}$$

where $B_f$ and $B_r$ [kgf/kgf/cm$^2$] represent brake factors of the front and rear wheels, respectively, and $T_f$ and $T_r$ [m] represent the treads of the front and rear wheels, respectively.

In the case of a heavy-duty vehicle such as a truck or bus, the brake factor and the tread greatly differ between the front and rear wheels. In controlling the braking air pressure, therefore, whether the wheel to be controlled is a front or rear wheel needs to be taken into consideration. The brake factor $B_f$ or $B_r$ is determined based on an amount of change in the braking force actually produced in the front or rear wheel, as measured per unit change of the braking air pressure.

Based on the above equations (3.1) and (3.2), the controlled variables dP for the braking air pressures can be calculated according to the equations below.

$$dP_f = M_d/(B_f T_f) \quad (4.1)$$

$$dP_r = M_d/(B_r T_r) \quad (4.2)$$

In accordance with the control modes applied to the wheels, one of the controlled variables $dP_f$ and $dP_r$ for the braking air pressures takes a positive value while the other takes a negative value.

The controlled variables $dP_f$ and $dP_r$ for the braking air pressures, calculated in the control block 64, are supplied to the command block 68. In the command block 68, the controlled variables $dP_f$ and $dP_r$ are converted to command signals (switching signals) for the supply valves 22 and the pressure control valves 10, and the command signals are output from the command block 68 to corresponding ones of the supply valves 22 and the pressure control valves 10.

Figure 4:
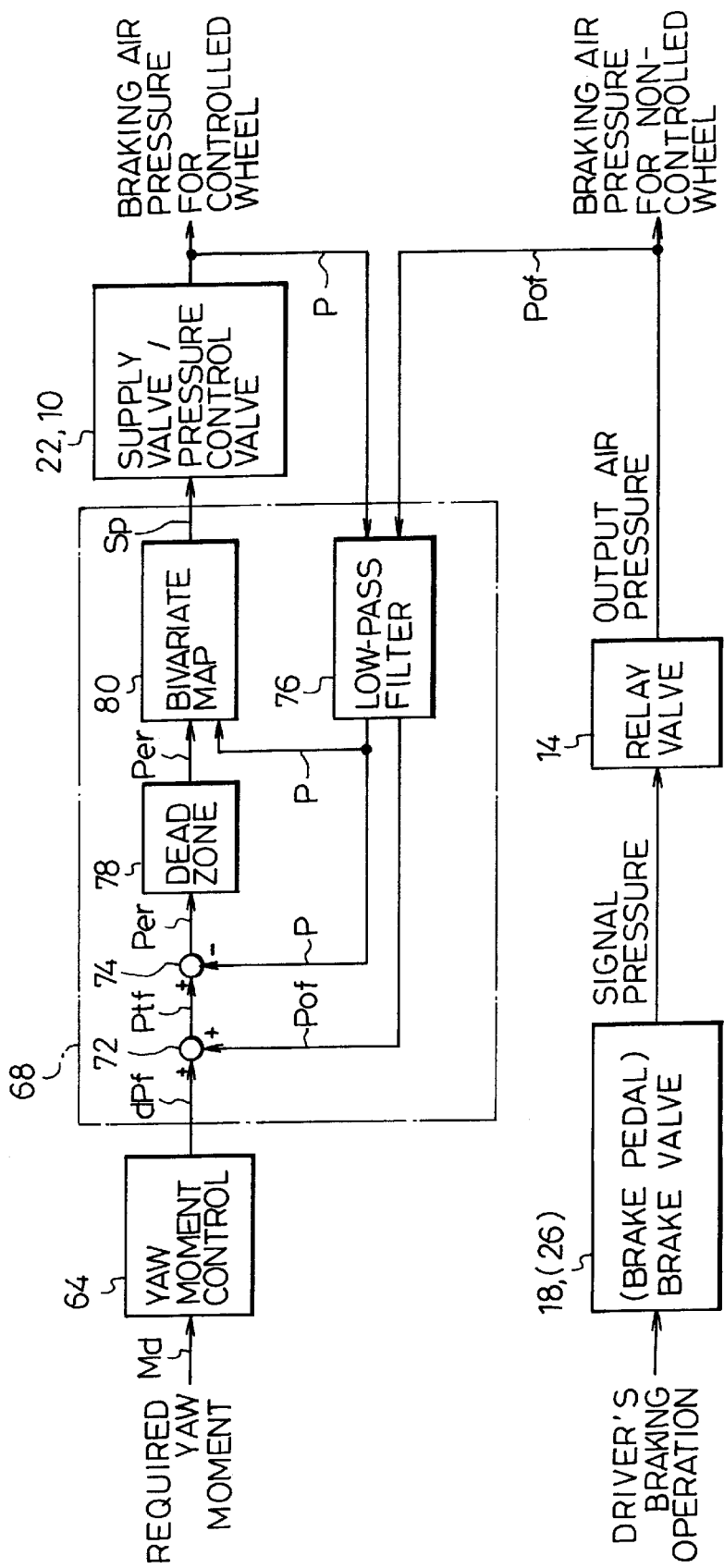
FIG. 4 is a diagram showing in detail a part of the procedure shown in FIG. 3.

FIG. 4 shows details of the command block 68. The command block 68 generates command signals for the individual wheels to be controlled. Where one of the wheels to be controlled is the left front wheel $W_{FL}$, command signals for the supply valve 22 and the pressure control valve 10 associated with the left front wheel $W_{FL}$ are generated as explained below.

Assuming that the vehicle 1 is turning to the right while being braked, the braking air pressure for the right front wheel $W_{FR}$ is determined by the stroke of depression of the brake pedal 26 by the driver, that is, the opening of the relay valve $14_f$ operated in accordance with the signal pressure from the brake valve 18. In this case, an actual braking air pressure $P_{of}$ of the right front wheel $W_{FR}$ corresponds to the air pressure output from the relay valve $14_f$. As shown in FIG. 4, the actual braking air pressure $P_{of}$ of the right front wheel $W_{FR}$, detected by the sensor 44, is supplied to the control system for controlling the braking air pressure of the left front wheel $W_{FL}$.

The control system for the left front wheel $W_{FL}$ has an adding section 72. The adding section 72 adds up the actual braking air pressure $P_{of}$ and the controlled variable $dP_f$ for the braking air pressure of the left front wheel $W_{FL}$ output from the control block 64, and supplies a subtracting section 74 with a target braking air pressure $P_{tf}$ for the left front wheel $W_{FL}$. In this case, if the controlled variable $dP_f$ for the braking air pressure is positive, the target braking air pressure $P_{tf}$ supplied is larger than the actual braking air pressure $P_{of}$, and if the controlled variable $dP_f$ for the braking air pressure is negative, the target braking air pressure $Pt_{tf}$ is smaller than the actual braking air pressure $P_{of}$.

The subtracting section 74 calculates a deviation $P_{er}$ of an actual braking air pressure P of the left front wheel $W_{FL}$ from the target braking air pressure $P_{tf}$. The actual braking air pressure P of the left front wheel $W_{FL}$ also is detected by the sensor 44. The detection signal from the sensor 44 has already been subjected to filtering at a low-pass filter 76 in the aforementioned filtering block 52.

The deviation $P_{er}$ output from the subtracting section 74 passes through a filter 78 and then is supplied to an arithmetic section 80. The filter 78 has a dead zone and removes noise contained in the detection signal of the sensor 44 or a fine fluctuation component in the actual braking air pressure P. The dead zone of the filter 78 is defined by thresholds of, for example, ±0.1 kgf/cm².

When the deviation $P_{er}$ is greater than a predetermined value, the arithmetic section 80 outputs a signal for switching the solenoid valve of the supply valve $22_f$ associated with the left front wheel $W_{FL}$. Accordingly, the connecting pipe 20 leading to the booster 4 associated with the left front wheel $W_{FL}$ is opened, and air pressure is supplied from the air tank 6 to the booster 4 through the connecting pipe 20 and the pneumatic pipe 8.

The arithmetic section 80 has a bivariate map which, using the deviation $P_{er}$ and the actual braking air pressure P as variables, define operation modes and their execution time periods for the pressure control valve 10. The bivariate map is stored beforehand in the storage circuit (not shown) of the ECU 28.

As will be clear from the foregoing description, the operation modes of the pressure control valve 10 include an air pressure supply mode, an air pressure discharge mode, and an air pressure hold mode. The operation mode execution time denotes a time period for which the solenoid of each solenoid valve in the pressure control valve 10 is energized.

Figure 5:
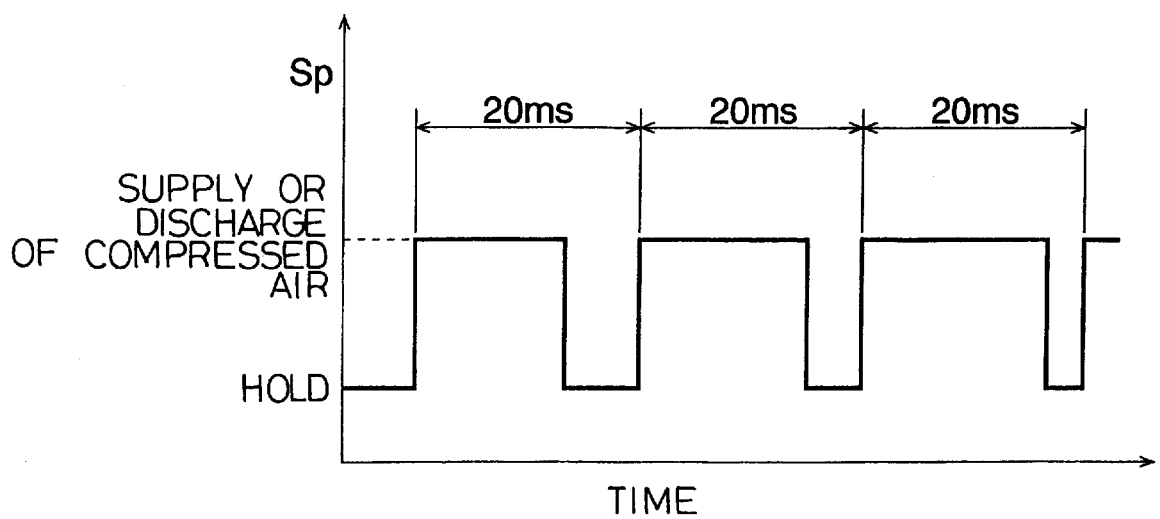
FIG. 5 is a chart showing a pulse signal output from a command block in FIG. 4.

Each solenoid valve in the pressure control valve 10 can be actuated at intervals of 1 ms, and the pressure control valve 10 has a control cycle of, for example, 20 ms. Accordingly, the arithmetic section 80 outputs a control signal $S_p$, which is a rectangular pulse as shown in FIG. 5, to the solenoid valve of the pressure control valve 10.

The solenoid valves of the supply valve 22 and pressure control valve 10 associated with the left front wheel $W_{FL}$ are switched in accordance with outputs from the arithmetic section 80. As a result, a desired braking air pressure is supplied to the booster 4 associated with the left front wheel $W_{FL}$. At this time, the braking air pressure supplied to the booster 4 is detected by the sensor 44. The detection signal from the sensor 44, that is, the actual braking air pressure P of the left front wheel $W_{FL}$, Is supplied to the subtracting section 74 and the arithmetic section 80 via the low-pass filter 76.

Thus, the braking air pressure feedback system determines the target braking air pressure $P_{tf}$ for the left front wheel $W_{FL}$ to be controlled, while referring to the actual braking air pressure of the right front wheel $W_{FR}$ which is a non-controlled wheel.

The command block 68 controls the control air pressure for a rear wheel to be controlled, in a like manner.

TABLE 2 below shows how the solenoid valves 10a and 10b are switched in the respective operation modes of the pressure control valve 10.

TABLE 2

| Pressure Control Valve | During Non-Control | Operation Mode | | |
| --- | --- | --- | --- | --- |
| | | Supply | Discharge | Hold |
| Solenoid Valve 10a | Off | Off | On | On |
| Solenoid Valve 10b | Off | Off | On | Off |

In TABLE 2, "Off" and "On" represent the rest position and the operating position of the solenoid valve, respectively.

The solenoid valves 10a and 10b of each pressure control valve 10 are switched in accordance with the operation mode of the control valve 10. More specifically, when the operation mode executed is the supply mode, the solenoid valves 10a and 10b of the pressure control valve 10 are kept at their rest position (Off) from the time of start of the aforementioned control cycle (20 ms) for a supply time period calculated by the arithmetic section 80. The operation mode of the pressure control valve 10 is thereafter switched to the hold mode for the remaining time of the control cycle. In this case, the solenoid valve 10a alone is switched from the rest position to the operating position. In the supply mode of the pressure control valve 10, air pressure is supplied from the air tank 6 to the corresponding booster 4 through the supply valve 22 and the pressure control valve 10, so that the braking air pressure in the booster 4 increases.

When the operation mode executed is the discharge mode, the solenoid valves 10a and 10b of the pressure control valve 10 are switched to their operating position (On) from the time of start of the control cycle for a discharge time period calculated by the arithmetic section 80. The operation mode of the pressure control valve 10 is thereafter switched to the hold mode for the remaining time of the control cycle. In the discharge mode of the pressure control valve 10, the braking air pressure in the booster 4 is discharged and thus drops.

FIGS. 6 through 9 each illustrate turning behavior of the vehicle 1 as a result of increase and decrease of the braking air pressures, that is, the braking forces, of the controlled wheels during the yaw moment control. In the case shown in FIG. 6, the vehicle tends to oversteer. Namely, in FIG. 6, an actual yawing direction of the vehicle 1 indicated by the dashed-line arrow is deviated inward from a target yawing direction of the vehicle indicated by the solid-line arrow. When the vehicle oversteers in a right turn, the left front wheel $W_{FL}$ and the right rear wheel $W_{RR}$ are selected as the wheels to be controlled, and the braking air pressures of these wheels are controlled.

In this case, in accordance with the yaw moment control, the control air pressure for the left front wheel $W_{FL}$ is increased by the controlled variable dF so that it may become equal to the target braking air pressure, while the control air pressure for the right rear wheel $W_{RR}$ is reduced by the controlled variable dF so that it may become equal to the target braking air pressure. Consequently, the braking force $F_{FL}$ of the left front wheel $W_{FL}$ becomes greater than the braking force $F_{FR}$ of the right front wheel $W_{FR}$, and similarly, the braking force $F_{RR}$ of the right rear wheel $W_{RR}$ becomes smaller than the braking force $F_{RL}$ of the left rear wheel $W_{RL}$. The difference in braking force between the right and left wheels acts on the vehicle 1 as a returning moment corresponding to the required yaw moment $M_d$ for canceling out the oversteer of the vehicle 1, with the result that the turning behavior of the vehicle is stabilized.

The braking forces of the wheels other than the controlled wheels, that is, the right front wheel $W_{FR}$ and the left rear wheel $W_{RL}$, are determined by the stroke of depression of the brake pedal by the driver.

Figure 7:
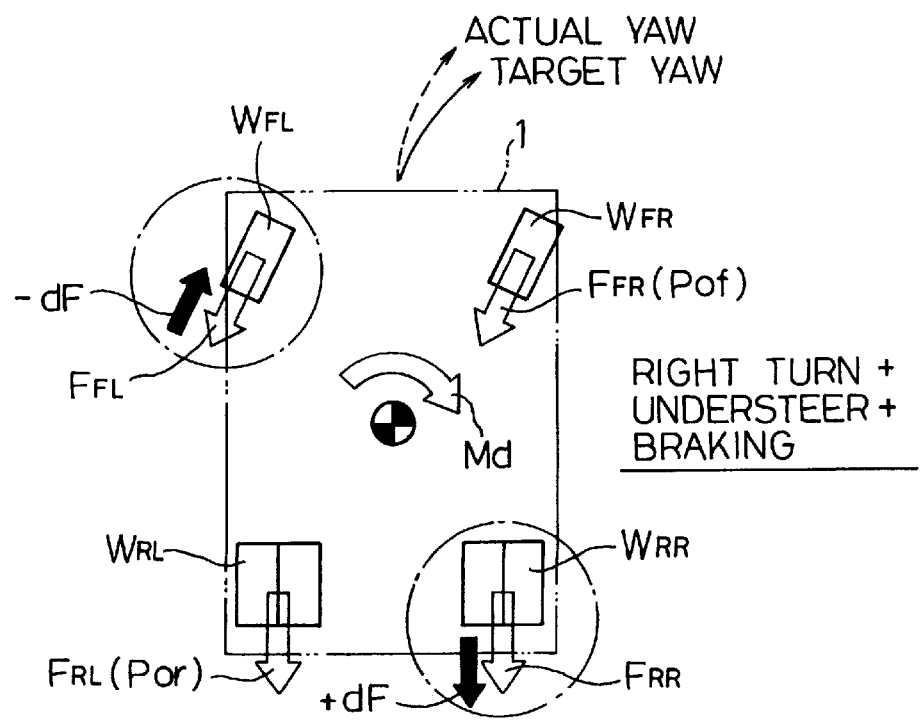
FIG. 7 is a diagram illustrating a function of the control apparatus performed when the vehicle tends to understeer.

In the case illustrated in FIG. 7, the vehicle tends to understeer. Initiating the yaw moment control in this case makes the braking force $F_{FL}$ of the left front wheel $W_{FL}$ smaller than the braking force $F_{FR}$ of the right front wheel $W_{FR}$ and makes the braking force $F_{RR}$ of the right rear wheel $W_{RR}$ higher than the braking force $F_{RL}$ of the left rear wheel $W_{RL}$. As a result, the vehicle 1 is acted upon by a turning moment canceling out the understeer of the vehicle, whereby the turning behavior of the vehicle 1 is stabilized.

Figure 8:
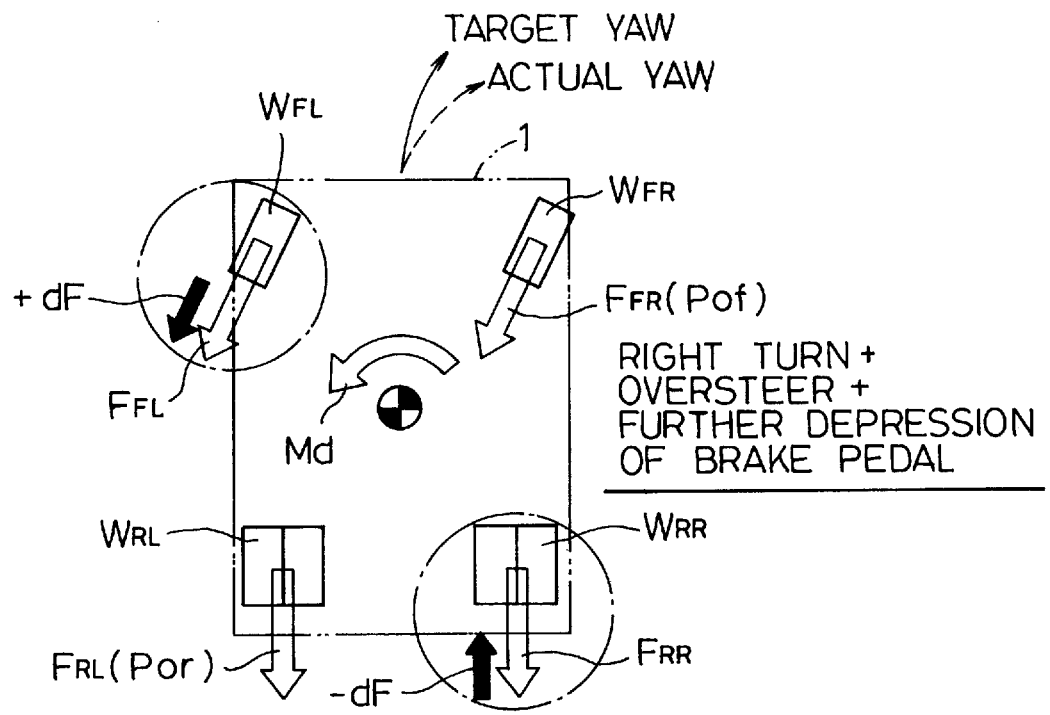
FIG. 8 is a diagram illustrating a function of the control apparatus performed in the case where, in the state shown in FIG. 6, the brake pedal is further depressed.
Figure 9:
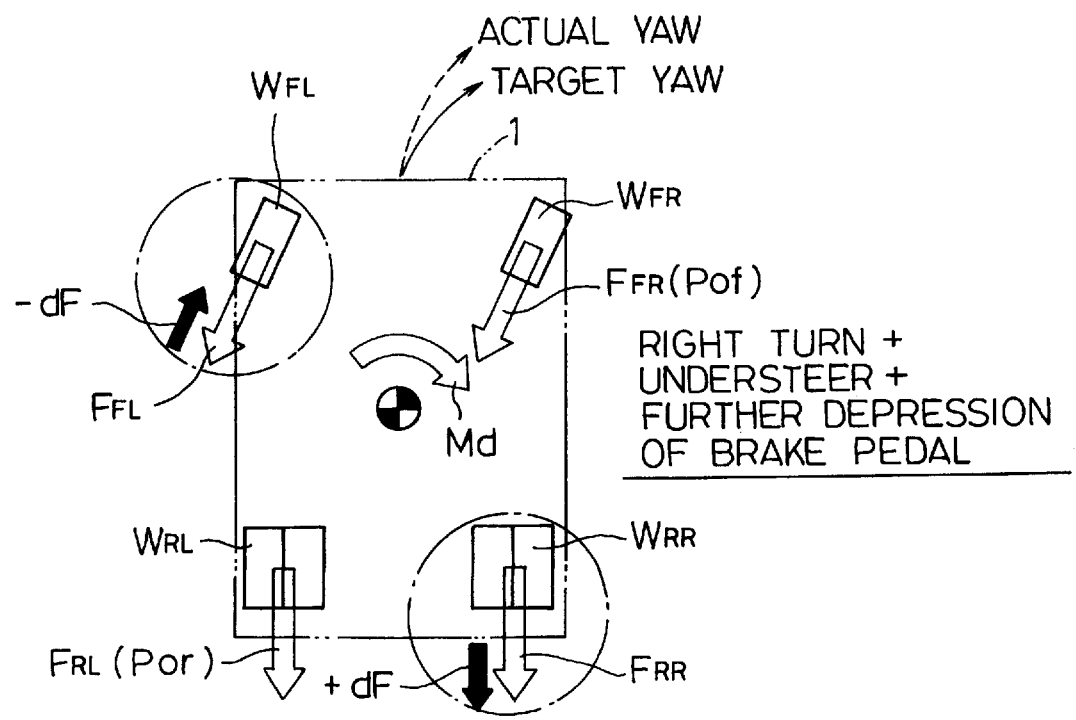
FIG. 9 is a diagram illustrating a function of the control apparatus performed in the case where, in the state shown in FIG. 7, the brake pedal is further depressed.

FIGS. 8 and 9 illustrate cases where the brake pedal 26 is further depressed by the driver while the vehicle 1 is turning with the brake applied.

Figure 6:
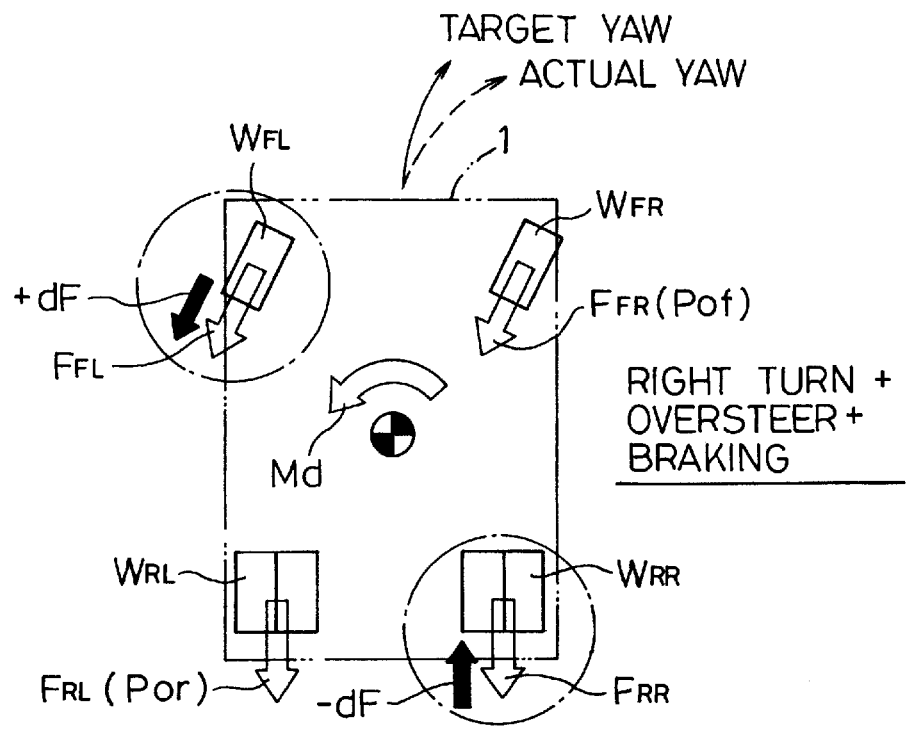
FIG. 6 is a diagram illustrating a function of the control apparatus performed when the vehicle tends to oversteer.

Specifically, FIG. 8 shows the case where, in the state shown in FIG. 6, the brake pedal 26 is further depressed. In this case, the braking forces of the right front wheel $W_{FR}$ and left rear wheel $W_{RL}$ which are the non-controlled wheels increase as the depression stroke of the brake pedal 26 increases. The braking air pressure for the left front wheel $W_{FL}$, which is a wheel to be controlled, is controlled so that it may become equal to the target braking air pressure determined based on the actual braking air pressure $P_{of}$ of the right front wheel $W_{FR}$ as mentioned above, and similarly, the braking air pressure for the right rear wheel $W_{RR}$, which is the other wheel to be controlled, is also controlled so that it may become equal to the target braking air pressure determined based on the actual braking air pressure $P_{of}$ of the left rear wheel $W_{RL}$. Consequently, the difference in braking force between the left front wheel $W_{FL}$ and the right rear wheel $W_{RR}$ becomes equal to the target braking force difference (corresponding to 2·dF) determined by the yaw moment control, with the result that the turning behavior of the vehicle 1 can be stabilized in a like manner.

More specifically, the adding section 72 (see FIG. 4) in the aforementioned command block 68 outputs the result of addition of the controlled variable ($dP_f$, $dP_r$) for the braking air pressure of the controlled wheel and the actual braking pressure ($P_{of}$, $P_{or}$) of the non-controlled wheel, so that change in the actual braking pressure of the non-controlled wheel is reflected in the controlled variable for the braking air pressure.

FIG. 9 illustrates the case where, in the state shown in FIG. 7, the brake pedal 26 is further depressed. In this case, the braking forces of the left front wheel $W_{FL}$ and right rear wheel $W_{RR}$, which are the wheels to be controlled, are controlled based on the respective target braking air pressures, that is, the target braking forces, which follow up change in braking force of the right front wheel $W_{FR}$ and the left rear wheel $W_{RL}$. As a result, also in this case, the difference in braking force between the left front wheel $W_{FL}$ and the right rear wheel $W_{RR}$ becomes equal to the target braking force difference determined by the yaw moment control, whereby the turning behavior of the vehicle 1 can be stabilized in a like manner.

Even in the case where the stroke of depression of the brake pedal 26 is reduced, the difference in braking force between the controlled wheels is controlled so that it may become equal to the target braking force difference determined by the yaw moment control.

According to the above-described yaw moment control for stabilizing the turning behavior of the vehicle, even if the depression stroke of the brake pedal 26 changes during the yaw moment control, the target braking air pressures for the controlled wheels are determined with reference to respective actual braking air pressures of the non-controlled wheels. Consequently, the target braking force difference between the right and left wheels is properly determined, whereby the vehicle can be acted upon by a suitable required yaw moment and the depressing operation of the brake pedal 26 by the driver can be reflected in the braking of the vehicle.

Where the diagonally located wheels of the vehicle are selected as wheels to be controlled, controlling these wheels permits the vehicle to be effectively acted upon by turning moment or returning moment even If change in braking force of the controlled wheels is small.

Since the braking air pressure for each wheel is monitored by the sensor 44, the braking forces, that is, the braking air pressures, of the controlled wheels can be controlled with reliability by the yaw moment control, thus improving the reliability of the yaw moment control. Further, the braking air pressures are controlled by the pressure control valves 10 arranged immediately upstream of the respective boosters 4, and accordingly, delay in the response of the boosters 4 can be minimized. Consequently, the apparatus of this invention is suited for a brake system for a heavy-duty vehicle, such as a truck or bus, which utilizes air pressure for braking.

This invention is not limited to the foregoing embodiment alone. For example, sensors for detecting the braking pressures in the respective hydraulic pipes 3 may be used instead of the sensors 44. In this case, the pressure feedback system of the command block 68 may use a proportional gain for converting hydraulic pressure to air pressure.

Further, in addition to the sensors 44, pressure sensors for detecting the air pressures output from the relay valves 14 or the signal pressures output from the brake valve 18 may be used. Such pressure sensors detect the braking air pressures of the non-controlled wheels. Where the signal pressures output from the brake valve 18 are detected by pressure sensors, the detection signals of the pressure sensors need to be corrected by means of a proportional gain to obtain signals corresponding to the air pressures output from the relay valves 14.

Also, the brake system to be used is not limited to the aforementioned air over hydraulic brake system and may be a full air brake system.

In cases where the right and left front wheels or the right and left rear wheels are selected as wheels to be controlled, the controlled variable dP for the braking air pressure for producing the required yaw moment is calculated according to the equation below.

$$dP = 2 \cdot M_d/(B \cdot T)$$

The apparatus according to this invention is equally applicable to a vehicle whose rear wheels are of a double axle type.

What is claimed is:

1. An apparatus for controlling braking forces of wheels of a vehicle when the vehicle is turning, to stabilize turning behavior of the vehicle, comprising:

wheel brakes provided for the respective wheels, each of the wheel brakes being supplied with a braking pressure and applying a braking force to a corresponding one of the wheels;

an adjusting device connected to the wheel brakes, the adjusting device being capable of adjusting the braking pressures of two, right and left wheels, among the wheels, independently of driver's braking operation;

a detection device for the vehicle, the detection device including a plurality of sensors arranged in the vehicle and detecting a traveling state of the vehicle based on outputs from the sensors when the vehicle is turning; said detection device including as the plurality of sensors, a yaw rate sensor for detecting a yaw rate of the vehicle, wheel speed sensors for detecting speeds of the wheels, a longitudinal acceleration sensor for detecting a longitudinal acceleration of the vehicle, a lateral acceleration sensor for detecting a lateral acceleration of the vehicle, and an angle sensor for detecting a rotational angle of a steering wheel of the vehicle, and the detection device further includes a state-of-motion calculation circuit for calculating a state of motion of the vehicle based on outputs supplied thereto from the yaw rate sensor, the wheel speed sensors, the longitudinal acceleration sensor and the lateral acceleration sensor and outputting a result of calculation, and a driving operation calculation circuit for calculating a state of driver's driving operation based on an output of the angle sensor supplied thereto and outputting a result of calculation;

brake controllers connected to brake circuits for supplying the braking pressures to the wheel brakes, respectively, and detecting fluid pressures in the brake circuits which are indicative of actual braking pressures in the wheel brakes, respectively; and a control device connected to the detection device and the brake controllers, the control device receiving outputs of the detection device and the brake controllers to:

set a target braking force difference to be produced between right and left wheels, select one of the right and left wheels as a controlled wheel, determine a target braking pressure for the controlled wheel based on the target braking force difference and the actual braking pressure of a non-selected one of the right and left wheels, and control the actual braking pressure of the controlled wheel by means of the adjusting device in accordance with the target braking pressure, thereby producing the target braking force difference between the right and left wheels and applying yaw moment to the vehicle.

2. The apparatus according to claim 1, wherein the controlled wheel and the non-selected wheel are an outer front wheel and an Inner rear wheel as viewed in a turning direction of the vehicle, respectively.

3. An apparatus for controlling braking forces of wheels of a vehicle when the vehicle is turning, to stabilize turning behavior of the vehicle, comprising:

wheel brakes provided for the respective wheels, each of the wheel brakes being supplied with a braking pressure and applying a braking force to a corresponding one of the wheels, an adjusting device connected to the wheel brakes, the adjusting device being capable of adjusting the braking pressures of two, right and left wheels, among the wheels, independently of driver's braking operation;

said adjusting device including automatic brake circuits connecting an air tank containing compressed air to the wheel brakes, and further includes a supply valve, a pressure control valve and an air over hydraulic booster arranged in each of the automatic brake circuits in series from an air tank side;

the supply valve comprises a normally-open, solenoid-operated on-off valve and supplies compressed air from the air tank to the corresponding automatic brake circuit when opened;

the pressure control valve adjusts pressure of the compressed air supplied from the corresponding supply valve and supplies the adjusted air pressure to the corresponding are over hydraulic booster;

the air over hydraulic booster converts the air pressure supplied from the corresponding pressure control valve to hydraulic pressure, to thereby generate a braking pressure in a corresponding one of the wheel brakes;

a detection device for the vehicle, the detection device including a plurality of sensors arranged in the vehicle and detecting a traveling state of the vehicle based on outputs from the sensors when the vehicle is turning;

brake controllers connected to brake circuits for supplying the braking pressures to the wheel brakes, respectively, and detecting fluid pressures in the brake circuits which are indicative of actual braking pressures in the wheel brakes, respectively; and a control device connected to the detection device and the brake controllers, the control device receiving outputs of the detection device and the brake controllers to:

set a target braking force difference to be produced between right and left wheels, select one of the right and left wheels as a controlled wheel, determine a target braking pressure for the controlled wheel based on the target braking force difference and the actual braking pressure of a non-selected one of the right and left wheels, and control the actual braking pressure of the controlled wheel by means of the adjusting device in accordance with the target braking pressure, thereby producing the target braking force difference between the right and left wheels and applying yaw moment to the vehicle.

4. An apparatus for controlling braking forces of wheels of a vehicle when the vehicle is turning, to stabilize turning behavior of the vehicle, comprising:

wheel brakes provided for the respective wheels, each of the wheel brakes being supplied with a braking pressure and applying a braking force to a corresponding one of the wheels;

an adjusting device connected to the wheel brakes, the adjusting device being capable of adjusting the braking pressures of two, right and left wheels, among the wheels, independently of driver's braking operation;

said adjusting device comprising automatic brake circuits connecting an air tank containing compressed air to the wheel brakes, the automatic brake circuits each including an air over hydraulic booster for converting air pressure to hydraulic pressure and transmitting the hydraulic pressure to a corresponding one of the wheel brakes, and the brake controllers each detect an air pressure in the corresponding automatic brake circuit at a location more upstream than the corresponding air over hydraulic booster; and a detection device for the vehicle, the detection device including a plurality of sensors arranged in the vehicle and detecting a traveling state of the vehicle based on outputs from the sensors when the vehicle is turning;

brake controllers connected to brake circuits for supplying the braking pressures to the wheel brakes, respectively, and detecting fluid pressures in the brake circuits which are indicative of actual braking pressures in the wheel brakes, respectively; and a control device connected to the detection device and the brake controllers, the control device receiving outputs of the detection device and the brake controllers to:

set a target braking force difference to be produced between right and left wheels, select one of the right and left wheels as a controlled wheel, determine a target braking pressure for the controlled wheel based on the target braking force difference and the actual braking pressure of a non-selected one of the right and left wheels, and control the actual braking pressure of the controlled wheel by means of the adjusting device in accordance with the target braking pressure, thereby producing the target braking force difference between the right and left wheels and applying yaw moment to the vehicle.

5. An apparatus for controlling braking forces of wheels of a vehicle when the vehicle is turning, to stabilize turning behavior of the vehicle, comprising:

wheel brakes provided for the respective wheels, each of the wheel brakes being supplied with a braking pressure and applying a braking force to a corresponding one of the wheels;

an adjusting device connected to the wheel brakes, the adjusting device being capable of adjusting the braking pressures of two, right and left wheels, among the wheels, independently of driver's braking operation;

control device performing feedback control such that the actual braking pressure of the controlled wheel becomes equal to the target braking pressure; and a supply device for supplying a braking pressure to each of the wheel brakes, and wherein the supply device includes hydraulic lines extending from the wheel brakes, respectively, pneumatic lines connected to the hydraulic lines through pneumatic pressure-to-hydraulic pressure conversion boosters, respectively, and a pedal-operated pneumatic pressure source for supplying the pneumatic lines with pneumatic pressure corresponding to driver's operation of a brake pedal; and the adjusting device including a pneumatic pressure source for supplying pneumatic pressure to the pneumatic lines independently of one another, and pressure control valves for controlling pressures in the respective pneumatic lines;

a detection device for the vehicle, the detection device including a plurality of sensors arranged in the vehicle and detecting a traveling state of the vehicle based on outputs from the sensors when the vehicle is turning;

brake controllers connected to brake circuits for supplying the braking pressures to the wheel brakes, respectively, and detecting fluid pressures in the brake circuits which are indicative of actual braking pressures in the wheel brakes, respectively; and a control device connected to the detection device and the brake controllers, the control device receiving outputs of the detection device and the brake controllers to:

set a target braking force difference to be produced between right and left wheels, select one of the right and left wheels as a controlled wheel, determine a target braking pressure for the controlled wheel based on the target braking force difference and the actual braking pressure of a non-selected one of the right and left wheels, and control the actual braking pressure of the controlled wheel by means of the adjusting device in accordance with the target braking pressure, thereby producing the target braking force difference between the right and left wheels and applying yaw moment to the vehicle.

6. The apparatus according to claim 5, wherein each the pressure control valve includes a solenoid-operated on-off valve inserted In the corresponding pneumatic line, and a solenoid-operated three-way valve inserted in the corresponding pneumatic line at a location more downstream than the solenoid-operated on-off valve, the solenoid-operated three-way valve having an inlet port connected to an upstream side of the corresponding pneumatic line and outlet and discharge ports connected to a downstream side of the corresponding pneumatic line.

7. An apparatus for controlling braking forces of wheels of a vehicle when the vehicle is turning, to stabilize turning behavior of the vehicle, comprising:

wheel brakes provided for the respective wheels, each of the wheel brakes being supplied with a braking pressure and applying a brake force to a corresponding one of the wheels;

an adjusting device connected to the wheel brakes, the adjusting device being capable of adjusting the braking pressure in at least one of right and left wheels, among the wheels, independently of driver's braking operation so that the braking pressures are increased or decreased;

a detection device for the vehicle, the detection device including a plurality of sensors arranged in the vehicle and detecting a traveling state of the vehicle based on outputs from the sensors when the vehicle is turning;

brake controllers for detecting fluid pressures in brake circuits, which are indicative of actual braking pressure in the wheel brakes, respectively, the brake circuits being able to supply the brake pressures to the wheel brakes, respectively;

a control device connected to the detection device and the brake controllers, the control device receiving outputs of the detection device and the broke controller to:

set a target braking force difference to be produced between right and left wheels, select one of the right and left wheels as a controlled wheel, the controlled wheel including an outer front wheel and an inner rear wheel as viewed in a turning direction of the vehicle, control the actual braking pressure of the controlled wheel by means of the adjusting device in accordance with the target braking force difference, and both increase or decrease as appropriate the actual braking pressure of the controlled wheel by means of the adjusting device in accordance with an actual braking pressure in the non-selected one of the right and left wheels and the target braking force difference when the vehicle is being braked, thereby producing the target braking force difference between the right and left wheels and applying yaw moment to the vehicle.

8. The apparatus according to claim 7, wherein an actual brake pressure in one of the outer front wheel and inner rear wheel is increased, and an actual brake pressure in the other is decreased when the actual brake pressures in the controlled wheels are controlled.

9. A method of controlling brake forces of wheels of a vehicle when the vehicle is turning, to stabilize turning behavior of the vehicle, the vehicle comprising wheel brakes provided for the respective wheels, each of the wheel brakes being supplied with a braking pressure and applying a braking force to a corresponding one of the wheels, an adjusting device connected to the wheel brakes and capable of adjusting the braking pressure in at least one of right and left wheels, among the wheels, independently of driver's braking operation so that the braking pressures are Increased or decreased, a detection device for the vehicle, the detection device including a plurality of sensors arranged in the vehicle and detecting a traveling state of the vehicle, based on outputs from the sensors when the vehicle is turning, and brake controllers detecting fluid pressures in brake circuits which are indicative of actual braking pressures in the wheel brakes, respectively, the brake circuits being able to supply the brake pressures to the wheel brakes, respectively, the method utilizing outputs of the detection device and the brake controllers for performing the steps of:

setting a target braking force difference to be produced between right and left wheels;

selecting one of the right and left wheels as a controlled wheel, the controlled wheel including an outer front wheel and an inner rear wheel as viewed in a turning direction of the vehicle;

controlling the actual braking pressure of the controlled wheel by means of the adjusting device in accordance with the target braking force difference, and both increase or decrease as appropriate the actual braking pressure of the controlled wheel by means of the adjusting device in accordance with actual braking pressure in the non-selected one of the right and left wheels, and the target braking force difference when the vehicle is being braked, thereby producing the target braking force difference between the right and left wheels and applying yaw moment to the vehicle.

10. The method of claim 9, wherein an actual brake pressure in one of the outer front wheel and inner rear wheel is increased, and an actual brake pressure in the other is f decreased when the actual brake pressures in the controlled wheels are controlled.

* * * * *